US011856015B2

(12) United States Patent
Levin et al.

(10) Patent No.: US 11,856,015 B2
(45) Date of Patent: Dec. 26, 2023

(54) ANOMALOUS ACTION SECURITY ASSESSOR

(71) Applicant: Microsoft Technology Licensing, LLC, Redmond, WA (US)

(72) Inventors: Roy Levin, Haifa (IL); Andrey Karpovsky, Kiryat Motzkin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

(21) Appl. No.: 17/357,546

(22) Filed: Jun. 24, 2021

(65) Prior Publication Data

US 2022/0417273 A1   Dec. 29, 2022

(51) Int. Cl.
*H04L 29/06* (2006.01)
*H04L 9/40* (2022.01)

(52) U.S. Cl.
CPC ........ *H04L 63/1425* (2013.01); *H04L 63/102* (2013.01); *H04L 63/1416* (2013.01); *H04L 63/1483* (2013.01); *H04L 63/20* (2013.01)

(58) Field of Classification Search
CPC ............... H04L 63/1425; H04L 63/102; H04L 63/1416; H04L 63/1483; H04L 63/20
See application file for complete search history.

(56) References Cited

U.S. PATENT DOCUMENTS

| 9,398,143 | B1* | 7/2016 | Fullmer | H04L 63/0861 |
| 9,516,053 | B1 | 12/2016 | Muddu et al. | |
| 9,798,883 | B1 | 10/2017 | Gil et al. | |
| 11,178,162 | B2* | 11/2021 | Boukricha | H04L 63/1425 |
| 11,483,328 | B2* | 10/2022 | Kirti | H04L 63/1425 |
| 2015/0150104 | A1* | 5/2015 | Melzer | G06N 20/00 726/7 |
| 2018/0137305 | A1* | 5/2018 | Barday | H04L 63/20 |
| 2018/0375886 | A1* | 12/2018 | Kirti | H04L 63/1425 |
| 2019/0377853 | A1* | 12/2019 | Obaidi | G06F 21/32 |
| 2020/0082098 | A1* | 3/2020 | Gil | H04L 63/1416 |

OTHER PUBLICATIONS

"International Search Report and Written Opinion Issued in PCT Application No. PCT/US22/030454", dated Sep. 2, 2022, 11 Pages.

* cited by examiner

Primary Examiner — Kambiz Zand
Assistant Examiner — Afaq Ali
(74) Attorney, Agent, or Firm — Wade IP Law PLLC

(57) ABSTRACT

An anomalous action security assessor is disclosed. An anomaly is received from a set of anomalies. A series of linked queries associated with the anomaly is presented to the user. The series of linked queries includes a base query and a subquery. The base query tests an attribute of the anomaly and resolves to a plurality of outcomes of the base query. The subquery is associated with an outcome of the plurality of outcomes of the base query. The series of linked queries finally resolve to one of tag the anomaly and dismiss the anomaly. A security alert is issued if the series of linked queries finally resolves to tag the anomaly.

20 Claims, 3 Drawing Sheets

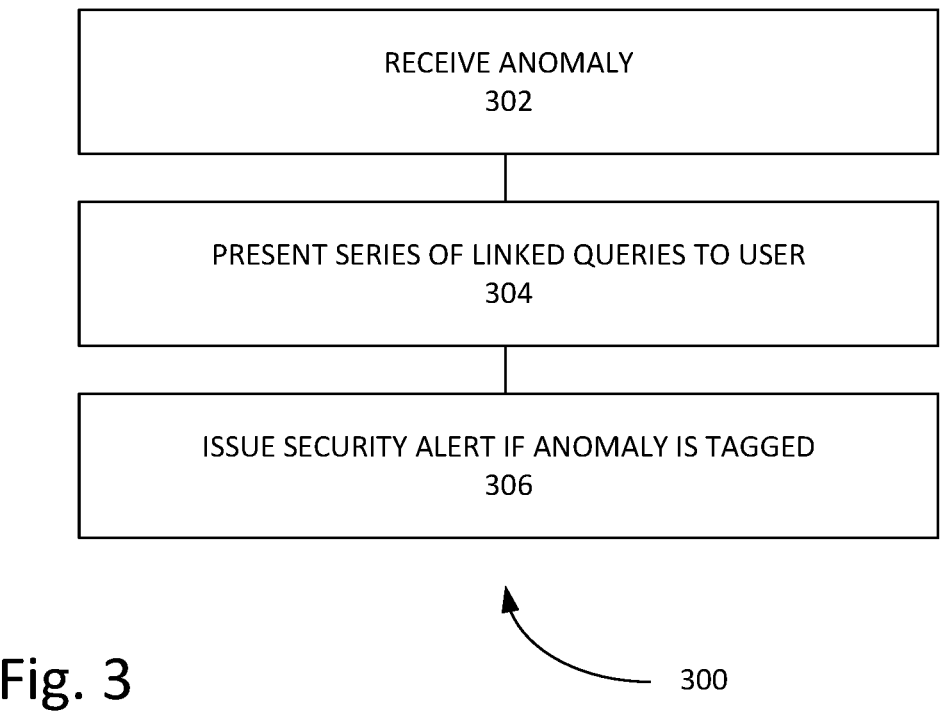
Fig. 3
Fig. 4
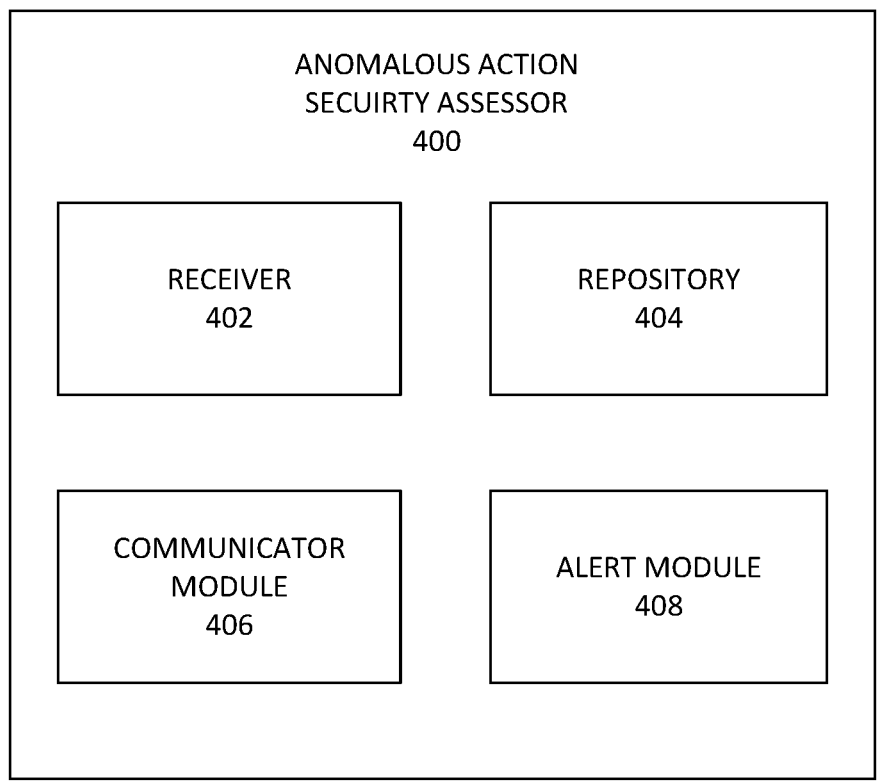

ANOMALOUS ACTION SECURITY ASSESSOR

BACKGROUND

Cyberattacks can include unauthorized operations done to an item in a computer network such as to network resources such as an item in a storage device operably coupled to a network, and in particular, as unauthorized attempts to access a system such as an enterprise network or cloud tenant. Unauthorized resource access may have a goal such as data exfiltration, or changing source code to add malware or a backdoor when the code is stored in cloud storage, or aiding ransomware by encrypting stored data, or exploiting a cloud storage customer's network account to gain free storage space for the attacker. One way to gain access to someone else's network account is by using social engineering techniques like phishing or by using a storage key that has unintentionally been leaked by an account owner. The attacker may attempt to masquerade as an authorized user in order to circumvent likely security systems protecting the network.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

A system or network can employ a security service to protect the system or network. Security services, such as security service with an anomalous action detector, can be implemented to detect user behaviors or actions on the system and respond to actions that are anomalous, such as actions that unexpected, out of the ordinary, and outside the scope of user privilege. A security service may identify certain anomalous actions as worthy of further security investigation and issue security alerts as a response to these certain anomalous actions, or anomalies. Many anomalous actions and anomalies, however, are false positives or, more particularly, benign true positives, and pose no threat to the system.

The present disclosure is directed to an anomalous action security assessor. In one example, the anomalous action security assessor is included in a security service, such as a security service with an anomalous action detector. In one example, the anomalous action security assessor can receive an anomaly from a set of anomalies, such as a set of anomalies tracked by the security service. Each anomaly in the set of anomalies is associated with a decision tree series of questions to be answered by a user, such as the user corresponding with session in which the anomaly occurred. The decision tree finally resolves as either to dismiss the anomaly or to tag the anomaly. If the resolution is to dismiss the anomaly, the anomaly is ignored and no security alert will issue. If the resolution is to tag the anomaly, a security alert will issue, and the anomaly will be investigated further.

In particular, a series of linked queries associated with the anomaly is presented to the user. The series of linked queries includes a base query and a subquery. The base query tests an attribute of the anomaly and resolves to a plurality of outcomes of the base query. The subquery is associated with an outcome of the plurality of outcomes of the base query. The series of linked queries finally resolve to one of tag the anomaly and dismiss the anomaly. A security alert is issued if the series of linked queries finally resolves to tag the anomaly.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

FIG. 3 is a schematic diagram illustrating an example method of the anomalous action security assessor in the security service of FIG. 2.

FIG. 4 is a block diagram illustrating an example implementation of the anomalous action security assessor on the computing device of FIG. 1.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
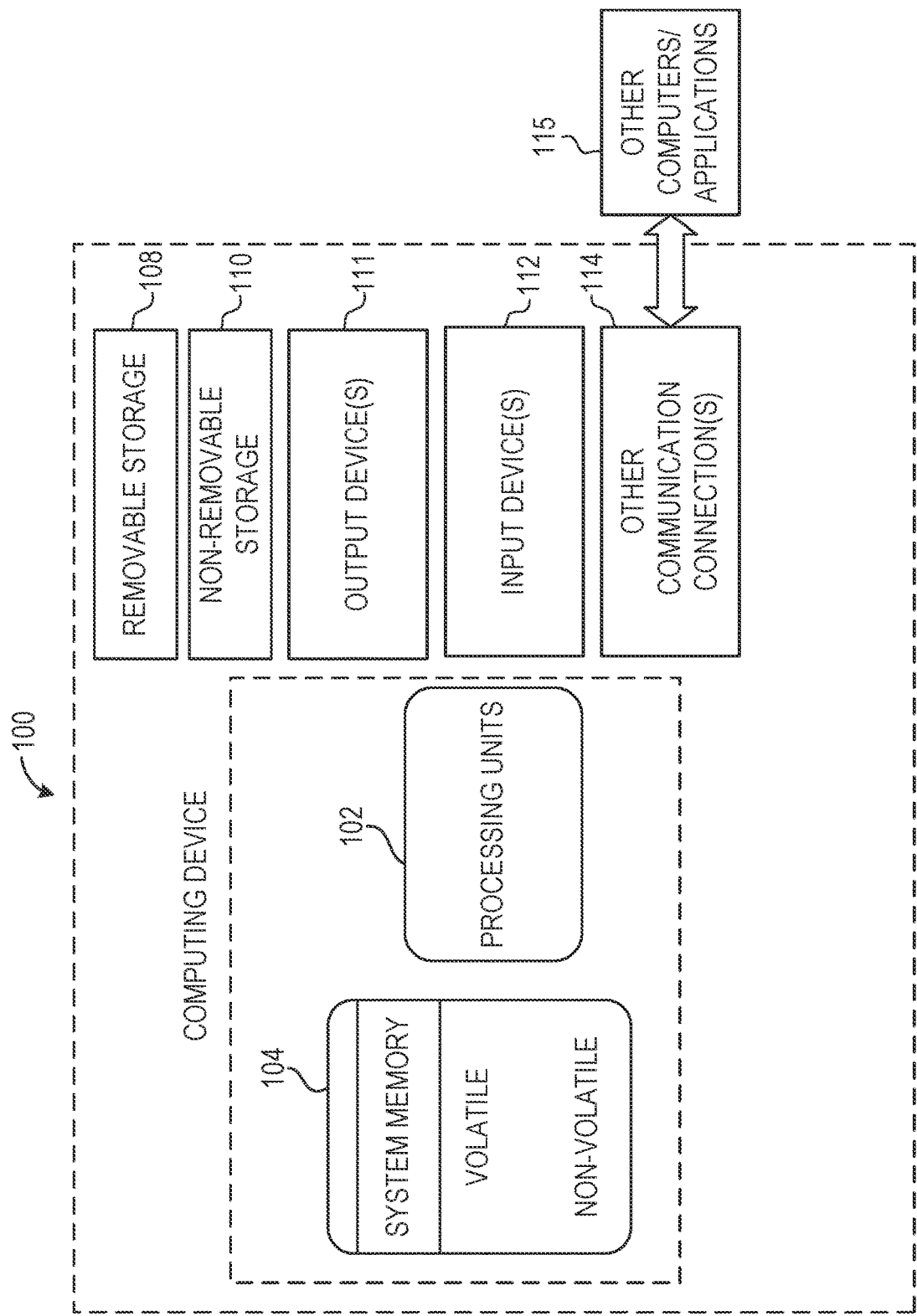
FIG. 1 is a block diagram illustrating an example of a computing device, which can be configured in a computer network to provide, for example, a cloud-computing environment.

FIG. 1 illustrates an exemplary computer system that can be employed in an operating environment and used to host or run a computer application included on one or more computer readable storage mediums storing computer executable instructions for controlling the computer system, such as a computing device, to perform a process. The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), nonvolatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

In one example, one or more of computing devices 100 can be configured as servers in a datacenter to provide distributed computing services such as cloud computing services. A data center can provide pooled resources on which customers or tenants can dynamically provision and scale applications as needed without having to add servers or additional networking. The datacenter can be configured to communicate with local computing devices such used by cloud consumers including personal computers, mobile devices, embedded systems, or other computing devices.

Within the data center, computing device 100 can be configured as servers, either as stand alone devices or individual blades in a rack of one or more other server devices. One or more host processors, such as processors 102, as well as other components including memory 104 and storage 110, on each server run a host operating system that can support multiple virtual machines. A tenant may initially use one virtual machine on a server to run an application. The datacenter may activate additional virtual machines on a server or other servers when demand increases, and the datacenter may deactivate virtual machines as demand drops.

Datacenter may be an on-premises, private system that provides services to a single enterprise user or may be a publicly (or semi-publicly) accessible distributed system that provides services to multiple, possibly unrelated customers and tenants, or may be a combination of both. Further, a datacenter may be a contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

A cloud-computing environment is generally implemented in one or more recognized models to run in one or more network-connected datacenters. A private cloud deployment model includes an infrastructure operated solely for an organization whether it is managed internally or by a third-party and whether it is hosted on premises of the organization or some remote off-premises location. An example of a private cloud includes a self-run datacenter. A public cloud deployment model includes an infrastructure made available to the general public or a large section of the public such as an industry group and run by an organization offering cloud services. A community cloud is shared by several organizations and supports a particular community of organizations with common concerns such as jurisdiction, compliance, or security. Deployment models generally include similar cloud architectures, but may include specific features addressing specific considerations such as security in shared cloud models.

A hybrid cloud is a deployment model that includes two or more clouds, such as private clouds, public clouds, and community clouds or combinations of two or more of each deployment model, that remain unique entities. Hybrid clouds include technology to bind together the two or more clouds, and in some examples permit data and application portability across clouds, such as cloud bursting for load balancing, and service interoperability.

Cloud-computing providers generally offer services for the cloud-computing environment as a service model provided as one or more of an infrastructure as a service, platform as a service, and other services including software as a service. Cloud-computing providers can provide services via a subscription to tenants or consumers. For example, software as a service providers offer software applications as a subscription service that are generally accessible from web browsers or other thin-client interfaces, and consumers do not load the applications on the local computing devices. Infrastructure as a service providers offer consumers the capability to provision processing, storage, networks, and other fundamental computing resources where the consumer is able to deploy and run software, which can include operating systems and applications. The consumer generally does not manage the underlying cloud infrastructure, but generally retains control over the computing platform and applications that run on the platform. Platform as a service providers offer the capability for a consumer to deploy onto the cloud infrastructure consumer-created or acquired applications created using programming languages, libraries, services, and tools supported by the provider. In some examples, the consumer does not manage or control the underlying cloud infrastructure including network, servers, operating systems, or storage, but has control over the deployed applications and possibly configuration settings for the application-hosting environment. In other examples, the provider can offer a combination of infrastructure and platform services to allow a consumer to manage or control the deployed applications as well as the underlying cloud infrastructure. Platform as a service providers can include infrastructure, such as servers, storage, and networking, and also middleware, development tools, business intelligence services, database management services, and more, and can be configured to support the features of the application lifecycle including one or more of building, testing, deploying, managing, and updating.

Figure 2:
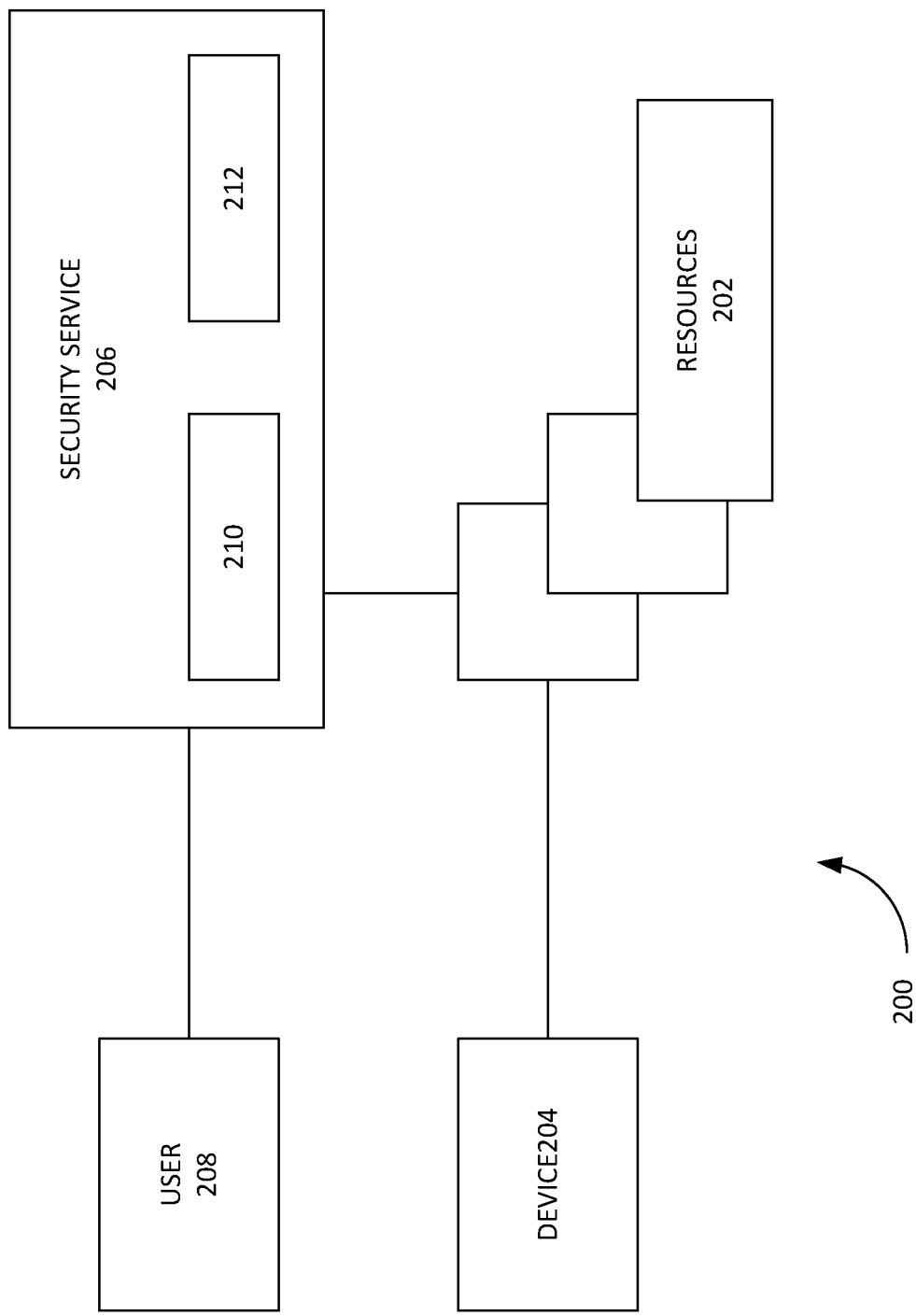
FIG. 2 is a schematic diagram illustrating an example environment of a security service including an anomalous action detector and an anomalous action security assessor for use with a computing device of FIG. 1.

FIG. 2 illustrates an example a computer network 200 having a network resource 202, such as a collection of network resources operably coupled together, that is accessible by a user of user device 204 on the computer network 200. In the example, the computer network 200 is operably coupled to a security service 206 that provides network security features to protect the network resource 202 from unauthorized access via the computer network 200. In one example, the computer network 200 can include a cloud-computing environment, such as a public cloud, to deploy applications and data on a platform and infrastructure across selected datacenters. In the illustrated example, the cloud-computing environment 200 can provided capability to a cloud tenant, such as one or more cloud tenants, to deploy applications and data as cloud-based assets to the cloud computing environment and address infrastructure issues. The cloud computing environment includes, or includes access to, resources available from one or more resource providers. A resource, such as network resource 202 can include a component of the application to be provisioned in a platform subscription and provides an item of the platform solution. Examples of resources 202 can include virtual machines, databases, virtual networks, and others. Resources 202 can be user-managed entities, entities automatically managed by a platform with the cloud environment 200, or a combination of user-managed and automatically managed entities. Resource providers include services that provide resources for the cloud-based assets. Resource providers include services to create, configure, and manage operations for working with the resource 202. Examples of resource providers include a compute provider to supply a virtual machine resource, storage provider to supply a storage account resource, web provider to supply resources related to web applications, and other resource providers.

Cloud tenants typically can communicate with other devices, including each other or with other users of devices 204 located outside the cloud environment via a network, such as the internet. In one example the cloud tenants can communicate with other devices via assigned network addresses, such as an assigned internet protocol (IP) addresses. In one example, a user of a device 204 can log in to a cloud tenant via a user account, and access resource 204 such as cloud-based assets from the cloud environment 200. In some examples, the resources 202 are available to authorized users, and the user account may have further restrictions via permissions from a set of permission levels to each authorized user account for each resource 202 in the computer network 200. The computer network 200 can also include a manager or service that provisions user accounts, tracks user accounts, and logs events or operations of the users via the accounts.

The security service 206 protects and secures resources 202 from malicious communication or other threats. In one example, the security service 206 can include controls to manage and configure the security of the assets and resources in order to customize the security for cloud tenants. Security service 206 can include isolation features to prevent unauthorized or unintentional transfer of data between other devices or networks or between deployments of a multi-tenant architecture. Additionally, security service 206 can include network and endpoint protection in the form of firewalls and virtual firewalls. For example, security service 206 can include a network group virtual firewall feature to control network traffic to instances of virtual machines. Additionally, security service 206 can provide for logging and monitoring events including security-related events with agents on each compute, storage, or fabric node in environment. Security service 206 can include a computer readable storage device, such as a suite of computer readable storage devices, to store computer executable instructions to control a processor, such as a server in a datacenter. For example, security service 206 can be implemented as part of an infrastructure or platform as a service such as for a cloud tenant.

A cloud tenant may permit user access to the assets 204 and resources 206 via one or more user accounts in a user session. In one example, a user can access a cloud tenant of the cloud tenants with a computing device 204 through the security service 206. For instance, the user may enter a username and password associated with the account to an authentication server or similar service for authentication and demonstration that the user is an authorized user with the credentials for privileges to access the cloud tenant. Once authenticated, the user can perform operations on the tenant in a user session, or simply session, until the user logs off the cloud tenant. The operations can include a sequence of commands and, for example, can include a sequence of process-creation events or a sequence of resource CRUD (Create, Read, Update, Delete) operations. In some examples, these operations may be recorded in logs such as a resource manager log and attributed to the user account or other credentials. In other examples, the security service 206 may generate a log of operations attributed to the user account or credentials.

The user of device 204 may be identified by access credentials that are stored on a storage device associated with an identity access management service. The access credentials may include the user name, passwords, permissions, and information related to the user's relationship with the enterprise, such as the cloud tenant. The user access credentials may be included with a user account. In one example, the user account associated with the user session corresponding with user device 204 may include information regarding an associated trusted device or associated trusted contact information, such as trusted mechanism 208 with which the user may receive data from the security system and provide the security system 206 with answers to queries. Examples of trusted devices and trusted contact information are implemented in security systems such as with multifactor authentication.

In one example, security service 206 attempts to mitigate or prevent malicious activity in the cloud tenants from attackers. In some cases, an attacker may attempt to perform unauthorized or malicious actions via the operations in a session. For example, an attacker may include an unauthorized user who is using the access credentials of an authorized user, or the attacker may include an authorized user with malicious intent such as a malicious insider. Security service 206 may implement a type of attack mitigation is based on rules defined by a security expert. For example, the rules may define or capture patterns of known attacks. These rules are continuously or periodically updated and maintained as known attacks become disseminated among security experts. Such attack mitigation, however, is not well suited to detect newly developed or previously undefined attacks. Further, attackers can modify known attacks to avoid detection. Security service 206 may implement a type of attack mitigation is based on detecting anomalous actions such as irregular behaviors or irregular operations or sets of operations during the session.

Security service 206 includes an anomalous action detector 210, which in one example, can be incorporated into security service 206. The anomalous action detector 210 can include a computer readable storage device to store computer executable instructions to control a processor, such as a server in a datacenter. In one example, anomalous action detector 210 can be implemented as part of an infrastructure or platform as a service such as for a cloud tenant. In another example, anomalous action detector 210 can be implemented as a software as a service such as for subscribers in other clouds, hybrid clouds, or private networks. In one example, the anomalous action detector 210 can be implemented as a computer program to run a processor. The anomalous action detector 210 tracks user actions in user behaviors to distinguish anomalous user actions from typical user actions and, from the anomalous user actions, identifies anomalies in the set of anomalies.

In one implementation, the anomalous action detector 210 can learn or be programmed to recognize the typical user actions of an authorized user in a logon session and can identify deviations to the typical behavior in a logon session as anomalous user actions that can be used to determine whether a user in the logon session is the authorized user. An anomalous user action includes identified deviations from typical actions in behavior that have been defined by or selected from a set of actions of security service 206. For example, security system 206 may have defined or selected a set of anomalous actions, that when identified as performed on the computer network 200 can lead to an attack mitigation. Security service 206, such as anomalous action detector 210, detect user behaviors on the system, and respond to behaviors that are anomalous, such as unexpected, out of the ordinary, and outside the scope of privilege. In one example, the user may establish a pattern of actions for a behavior, and actions that are deviations from the pattern of action may detected as anomalous actions. Anomalous actions from a user behavior of logging on to a resource may include attempting access from an atypical geolocation for the user, with a new or different computing device than usual, at an atypical time of day than, for instance, a user's typical work day, and attempting to access different resources than in a typical user session. An anomaly, or a set of anomalies, includes anomalous user actions that may indicate a security breach or be worthy of further investigation. For example, a security service can define certain anomalous actions as anomalies worthy of further security investigation. These anomalies can comprise a set of anomalies. Security service may issue security alerts to investigate an anomalous action if detected or take action to protect the computer network 200 such as deny computing device 204 access to resource 202 even if computing device has established an ostensibly authorized session such as with an appropriate user credentials. Many anomalous actions marked as anomalies, however, are false positives or, more likely, benign true positives, and pose no threat to the computer network.

In the example, security service 206 also includes an anomalous action security assessor 212 that may be operably coupled to the anomalous action detector 210. The anomalous action security assessor 212 can include a computer readable storage device to store computer executable instructions to control a processor, such as a server in a datacenter. In one example, anomalous action security assessor 212 can be implemented as part of an infrastructure or platform as a service such as for a cloud tenant. In another example, anomalous action security assessor 212 can be implemented as a software as a service such as for subscribers in other clouds, hybrid clouds, or private networks. In one example, the anomalous action security assessor 212 can be implemented as a computer program to run a processor. The anomalous action security assessor 212 receives anomalies, which may be identified by the anomalous action detector 210, and can determine whether a security alert is to be issued in the security service 206, which may take further action. For example, the anomalous action security assessor 212 can determine, or resolve, that a received anomaly is to be dismissed or tagged. If the resolution is to dismiss the anomaly, the anomaly may be logged, but the taken against the anomaly is to ignore the anomaly and no security alert is issued. If the resolution is to tag the anomaly, a security alert will issue, and the anomaly will be investigated further. In one example, the security service can log the anomaly and learn from the anomaly, but no security alert will issue if the resolution is to dismiss the anomaly and thus no security action to mitigate an attack will ensue from the received anomaly. If the resolution is to tag the anomaly, however, a security alert will issue. In response to a security alert, the security service will take further security action to mitigate the anomaly which may include alert security personnel and take an automatic action to protect the resource such as disable the session such as disable access of the user 204 to the system 202.

FIG. 3 illustrates an example method 300 that can be implemented with the anomalous action security assessor 212 of the security service 206. For instance, the method 300 can be performed or assisted with the anomalous action security assessor 212. In the example, the security service 206 can include an anomalous action detector 210. In one example, the method 300 is implemented as system having a processor and a memory device such as processor 102 and memory 104 on computing device 100. The memory device, such as memory 104 can be applied to store computer executable instructions for causing the processor 102 to perform the method 300, such as a program for assessing anomalies.

The security service 206 can be configured, such as via anomalous action detector 210, to seek and track a set of anomalies from a set of anomalous actions on the network. The anomalous action can be characterized and defined, or selected from a larger set of user actions. For instance, a first security service may define a selected anomalous action as an anomaly whereas a second security service may not define the selected anomalous action as an anomaly. For instance, a user action may include a log in attempt outside of the user's core working hours. A first enterprise with strict working hours may deem every log in outside of a user's designated working hours as an anomalous action that provides an anomaly to the anomalous action security assessor 212, whereas a second enterprise with more flexible working hours may deem some log ins outside of a user's core working hours as typical user actions that do not provide an anomaly to the anomalous action security assessor 212. The second enterprise, however, may deem an anomalous user action of a log in outside of the user's core working hours as an anomaly if, for example, log ins outside of the user's core working hours are atypical or unusual. In one example, regardless of how the security service 206 deems an action to be an anomalous user action that generates an anomaly, the anomaly is characterized and provided to the anomalous action security assessor 212, which receives the anomaly from a set of possible anomalies to which method 300 can be applied at 302.

In one example, an anomaly may include a user logging in to a system from an unexpected geographical location. The user may typically log in to the system from city "A" everyday day after day, but this time the log in may come from city "B" in another part of the globe. Security service 206, such as anomalous action detector 210, may determine the behavior as anomalous and characterize this as an "Anomalous Geolocation" anomaly and provides the anomaly to the anomalous action security assessor 212, which receives the anomaly at 302. In another example, an anomaly may include a user logging in to the system from an unexpected computing device. The user may typically log in to the system from a laptop computing device "C" on most days, but this time the log in may come from a previously unrecognized computing device "D," such as a new tablet or different laptop. Security service 206, such as anomalous action detector 210, may determine the behavior as anomalous and characterize this as an "Anomalous Computing Device" anomaly and provides the anomaly to the anomalous action security assessor 212, which receives the anomaly at 302. In still other examples, the anomaly may include a series of unusual commands from the user, or an atypical resource accessed by the user. In still another example, a set of actions from a behavior may include a plurality of anomalies. For instance, a log in may indicate an anomalous geolocation anomaly from an atypical computing device at an atypical time of day, all of which are included in a set of anomalies, and are received at the anomalous action security assessor 212 at 302.

Data received at the anomalous action security assessor 212 at 302 can include the characterization of the anomaly and other data, such as log entries identifying locations, computing device, and actions that provide context to the identified anomaly that may be used in method 300.

Each anomaly in the set of anomalies, such as the anomalies tracked by security service 206, is associated with a decision-tree series of questions to be provided to and answered by the user of the user account to which the anomaly corresponds at 304. For example, a first type or characterization of anomalous action, or a first anomaly, is associated with a first decision-tree series of questions and a second type or characterization of anomalous action, or a second anomaly, is associated with a second decision-tree series of questions. In one example, the user account may include information such as an identified trusted computing device or identified trusted contact information to which the decision-tree series of questions are to be presented, such as presented from the anomalous action security assessor 212 and from which answers to the decision-tree series of the questions is to be received by the anomalous action security assessor 212.

The decision-tree series of question is presented as a series of linked queries that are associated with the anomaly of the set of anomalies. The linked queries include a base query to test an attribute of the anomaly, and the test resolves to a plurality of outcomes. Each of the plurality of outcomes may include subqueries to test an attribute of the outcome. The series of linked queries finally resolve to either tag the anomaly or dismiss the anomaly. For example, the base query may correspond to a root or root node of a decision tree, and the node resolves into a plurality of outcomes as branches of the decision tree. Subqueries of the decision tree can further include additional subqueries, and the leaves of the decision tree include the final resolves of tag the anomaly or dismiss the anomaly.

For example, an anomaly may include a user logging in to the system from an unexpected location. The user may typically log in to the system from city "A" everyday day after day, but this time the log in may come from city "B." Rather than issue a security alert automatically, the user is presented with a decision tree, or series of linked queries, that relate to an unusual location of log in. The base query may include whether the user, or entity associated with the log in account, logged in from city "B." The plurality of outcomes to the base query can include "yes" and "no." If the user answers "yes," then the outcome can be resolved to dismiss the anomaly. If the user answers "no," then the outcome can resolve to a subquery as to whether the user is using a proxy server for the log in. The plurality of outcomes to the subquery can include "yes" and "no." If the user answers "yes" to the subquery, then the subquery outcome can be resolved to dismiss the anomaly. If the user answers "no" to the subquery, then the subquery outcome can resolve to still another subquery or finally resolve to tag the anomaly.

The queries in the series of linked queries for the anomaly continue until a final resolution is reached. If the series of linked queries finally resolves to tag the anomaly, a security alert is issued and actions can be taken such as to remove access at 306. If the series of linked queries for the anomaly resolves to dismiss the anomaly, the inquiry ends, the anomaly is permitted, and the particular anomalous behavior is allowed to proceed in this circumstance.

In one example, a user behavior identified by the anomalous action detector 210 may include a set of actions that correspond with a set of anomalies tracked by the anomalous action detector 210. In the example, a log in may indicate an anomalous geolocation anomaly from an atypical computing device at an atypical time of day, all of which are included in a set of anomalies, such as anomalies tracked by an anomalous action detector 210 or ready to be assessed for a security alert by the anomalous action security assessor 212, and are received at the anomalous action security assessor 212 at 302. Each anomaly is associated with a series of linked queries, and each associated series of linked queries is presented to the user at 304. A linked query of the associated linked queries may include a test, such as one or more queries, that are also found in another linked query of the associated linked queries. In one example, the repeated or duplicate query or queries is found in multiple linked queries is resolved for each linked query when it is resolved for one linked query, so the user does not answer the same query more than once for each behavior. An outcome of the query is applied to another series of linked queries. For example, if a query in one series of linked queries includes "Are you using a proxy server?" also appears in another series of linked queries presented to the user for a different anomaly for the same behavior, the answer of "yes" or "no"

for the linked query will also provide the answer to the query of other series of linked queries. In this example, an outcome of "yes" the test of "Are you using a proxy server?", such as for the series of linked queries associated with the Anomalous Geolocation anomaly is applied to the test of "Are you using a proxy server?" in another series of linked queries, such as for the series of linked queries associated with the Anomalous Computing Device anomaly.

FIG. 4 illustrates an example anomalous action security assessor 400, which can correspond with the anomalous action security assessor 212 of FIG. 2 and used to implement the method 300. In one example, the anomalous action security assessor 400 is implemented as a system having a processor and memory device, such as processor 102 and memory 104 on computing device 100. The memory device, such as memory 104 can be applied to store computer executable instructions for causing the processor 102 to perform the method 300, such as a program assessing security related to anomalous actions. The program for assessing security related to anomalous actions can include features to receive an anomaly from a set of anomalies, such as at 302, present a series of linked queries associated with the anomaly to a user, such as at 304, and issue a security alert if the series of linked queries finally resolves to tag the anomaly, such as 306.

The anomalous action security assessor 400 can include an anomaly receiver 402 that operably couples the anomalous action security assessor 400 to, for example, an anomalous action detector 210 of security service 206, to receive an anomaly connected with a behavior. In one example, the anomalous action detector 210 may present a plurality of anomalies connected with the behavior to the anomaly receiver 402. The anomalous action security assessor 400 can include or have access to a series of linked queries repository 404. The series of linked queries repository 404 includes a plurality of series of linked queries. In one example, the series of linked queries repository 404 includes a series of linked queries associated with each anomaly in a set of anomalies, such as the anomalies tracked by the anomalous action detector 210. Each of the plurality of series of linked queries includes a base query to test an attribute of the anomaly and resolves to a plurality of outcomes of the test, and each sub-query is associated with an outcome of the plurality of outcomes of the test, the series of linked queries finally resolves to at least tag the anomaly and dismiss the anomaly.

The anomalous action security assessor 400 fetches from the repository 404 the series of linked queries associated with the anomaly received at the anomaly receiver 402 and provides the series of linked queries associated with the anomaly to a user communication module 406. The user communication module 406 presents the series of linked queries associated with the anomaly to the user, such as via a received user contact data over the network 200, to test attributes of the anomaly and to receive answers from the user regarding the outcome of each test. The user communication module 406 presents a base query to test an attribute of the anomaly to the user, such as user device 204 or trusted mechanism 208. Based on the user's response to the base query, received at the communication module 406, which resolves to an outcome of a plurality of outcomes, a subquery is provided to the user via communication module 406. The subquery is associated with a plurality of subquery outcomes. The user's response to the subquery is received at the communication module 406 resolves to a subquery outcome of the plurality of subquery outcomes. The series of linked queries finally resolves to at least tag the anomaly and dismiss the anomaly. A security alert is issued via alert module 408 if the series of linked queries finally resolves to tag the anomaly.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method, comprising:
receiving data regarding an anomaly that is included in a set of anomalies;
presenting a series of linked queries that are associated with the anomaly to a user that performs anomalous behavior associated with the anomaly, the series of linked queries including:
a base query to perform a test of an attribute of the anomaly such that the test resolves to a plurality of outcomes of the base query, and
a subquery associated with an outcome of the plurality of outcomes of the base query;
tagging the anomaly based on responses to the series of linked queries; and
issuing a security alert based on the anomaly being tagged.

2. The method of claim 1, wherein another series of linked queries is associated with another anomaly from the set of anomalies.

3. The method of claim 1, wherein the series of linked queries is presented to a trusted contact of the user.

4. The method of claim 1, wherein the security alert includes disabling access of the user to a system.

5. The method of claim 1, wherein the anomaly corresponds to a user account of the user.

6. The method of claim 1, wherein the anomaly indicates anomalous behavior in a logon session of the user.

7. The method of claim 6, wherein the anomaly indicates use of an anomalous computing device by the user during the logon session.

8. The method of claim 6, wherein the anomaly indicates the logon session occurring at an anomalous time.

9. The method of claim 1, wherein the anomaly indicates an anomalous geolocation of the user.

10. The method of claim 1, wherein the anomaly indicates an attempt to access an anomalous resource.

11. A computer readable storage device to store computer executable instructions to control a processor to:
receive data regarding an anomaly that is included in a set of anomalies;
present a series of linked queries that are associated with the anomaly to a user that is associated with the anomaly, the series of linked queries including:
a base query to perform a test of an attribute of the anomaly such that the test resolves to a plurality of outcomes of the base query, the base query to be answered by the user with a first response that corresponds to a first outcome of the plurality of outcomes, and
a subquery associated with the first outcome of the plurality of outcomes of the base query, the subquery to be answered by the user with a second response;
tag the anomaly based on responses to the series of linked queries, the responses including the first response and the second response; and
issue a security alert based on the anomaly being tagged.

12. The computer readable storage device of claim 11, wherein the series of linked queries is included as a plurality of series of linked queries; and
 wherein the plurality of series of linked queries are stored in a repository.

13. The computer readable storage device of claim 11, wherein the data regarding the anomaly is received from an anomalous action detector; and
 wherein the anomalous action detector tracks user actions to distinguish anomalous user actions from typical user actions and identifies anomalies in the set of anomalies.

14. The computer readable storage device of claim 11, wherein issuance of the security alert includes disabling a user session corresponding with the anomaly and presenting an alert to security personnel.

15. The computer readable storage device of claim 11, wherein the computer executable instructions control the processor to:
 receive a characterization of the anomaly.

16. A system, comprising:
 a memory device to store a set of instructions; and
 a processor to execute the set of instructions to:
  receive data regarding an anomaly that is included in a set of anomalies;
  present a series of linked queries that are associated with the anomaly to a user that performs the anomaly, the series of linked queries including:
   a base query to perform a test of an attribute of the anomaly such that the test resolves to a plurality of outcomes of the base query, and
   a subquery associated with an outcome of the plurality of outcomes of the base query;
  tag the anomaly based on responses to the series of linked queries; and
  issue a security alert based on the anomaly being tagged.

17. The system of claim 16, wherein the instructions are implemented with a security service of a cloud environment; and
 wherein the security service protects cloud-based assets and resources.

18. The system of claim 17, wherein the anomaly indicates anomalous behavior in a logon session of the user.

19. The system of claim 16, wherein the anomaly indicates a series of anomalous commands from the user.

20. The system of claim 16, wherein the anomaly indicates at least one of the following:
 an anomalous geolocation of the user;
 use of an anomalous computing device by the user during the logon session;
 the logon session occurring at an anomalous time;
 an attempt to access an anomalous resource.

* * * * *